B. BROWER.

INKSTAND.

No. 7,419. Reissued Dec. 5, 1876.

Witnesses;

Geo. H. Graham.

M. B. Philipp

Inventor;

Bloomfield Brower

UNITED STATES PATENT OFFICE.

BLOOMFIELD BROWER, OF NEW YORK, N. Y.

IMPROVEMENT IN INKSTANDS.

Specification forming part of Letters Patent No. 144,825, dated November 25, 1873; reissue No. 7,419, dated December 5, 1876; application filed November 11, 1876.

*To all whom it may concern:*

Be it known that I, BLOOMFIELD BROWER, of the city, county, and State of New York, have invented a certain new and useful Improvement in Inkstands, of which the following is a specification:

Prior to my invention barometer reservoir-inkstands had been provided with a dipping cup or funnel in the neck thereof, and the inkstand had been so connected to a screw as to be raised and lowered thereby, to cause the ink to flow into the dipping cup or funnel. They had also been provided with a dipping cup or funnel in their neck, so constructed that a vent had to be opened on the top of the reservoir to cause the ink to flow into the dipping cup or funnel. Both of these forms are shown in English Patent No. 580, 1854.

The object of my invention is to produce a barometer reservoir-inkstand in which the ink will flow of itself into the dipping cup or funnel, no mechanical means being employed to accomplish this result, and in which only the clear fluid ink can be taken up by the pen; and my invention consists in a barometer reservoir-inkstand provided with a dipping cup or funnel having an opening and vent so constructed that the ink will flow into it of itself without the employment of mechanical means, and still allow only the clear fluid ink to be taken up by the pen.

Figure 1:
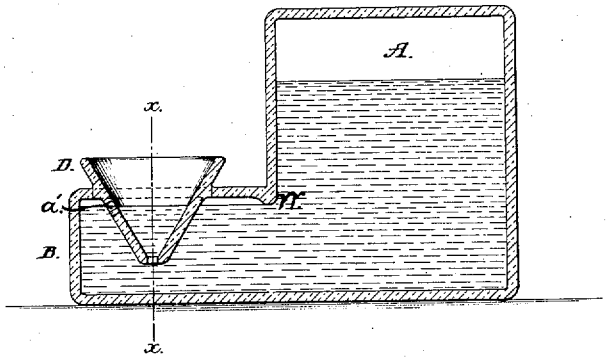
Figure 2:
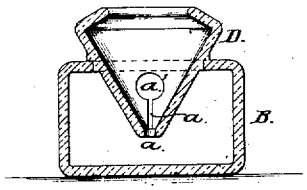

In the accompanying drawing, Figure 1 represents a longitudinal section of an inkstand embodying my invention. Fig. 2 is a cross-section at line *x x* of Fig. 1, with some modifications.

A represents the reservoir, with the usual neck B. D is a dipping cup or funnel attached to the top of the neck B, and extending into the vessel and below a line level with the internal projection W. In this dipping cup or funnel D suitable openings *a* are made, either in its bottom or in or around its sides, or in both places, so that the ink or air, or both, may pass freely through them.

The dipping cup or funnel D may be made to form one piece with the neck B, or the same may be made separate and fitted air-tight into a suitable hole made in the top part of the neck B, as shown in Fig. 2.

The reservoir A being filled either through the dipping cup or funnel D or through a suitable opening made in any desired part and afterward closed up air-tight, the ink will stand in the neck B on a line level, or nearly so, with the internal projection W, and which said level will be in the funnel D, as the ink can pass freely into the same through the opening or openings *a*.

The opening or openings *a* being small, the pen cannot pass through the same, and can only take up the clear fluid ink contained in the bottom of the dipping cup or funnel D, while the thick or sediment of the ink will remain in the bottom of the inkstand, and cannot get to the pen.

In my invention the dipping cup or funnel may be provided with a suitable vent or vents, *a'*, in or around its sides, or there may be a vent in the neck B.

When the dipping cup or funnel is in position, as shown in Fig. 1, the ink will flow of itself into the same, no mechanical means being employed to accomplish this result, such as the tilting of the inkstand or opening of vents or valves, as in the cases above referred to, or in other well-known cases.

What I claim as new, and desire to secure by Letters Patent, is—

A barometer reservoir-inkstand, provided with a dipping cup or funnel having an opening and vent so constructed that the ink will flow into the dipping cup or funnel, of itself, and still allow only the clear fluid ink to be taken up by the pen, substantially as shown and described.

BLOOMFIELD BROWER.

Witnesses:

ABBIE E. BROWER,

JOHN C. KLUBER.